United States Patent
Peng

[11] Patent Number: 5,326,962
[45] Date of Patent: Jul. 5, 1994

[54] DUAL-FOCUS OPTICAL SCANNER AND SUCH A SCANNER USED AS WANDTYPE SYMBOL

[75] Inventor: Ke-Ou Peng, Delft, Netherlands

[73] Assignee: Opticon Sensors Europe B.V., Hoofdorp, Netherlands

[21] Appl. No.: 907,824

[22] Filed: Jul. 2, 1992

[30] Foreign Application Priority Data

Jul. 8, 1991 [EP] European Pat. Off. ........ 91201783.7

[51] Int. Cl.⁵ .............................................. G06K 7/10
[52] U.S. Cl. ..................................... 235/472; 250/566
[58] Field of Search .................. 235/467, 472; 250/566

[56] References Cited

U.S. PATENT DOCUMENTS 4,105,926  8/1978  Reno et al. ......................... 250/566

FOREIGN PATENT DOCUMENTS 0137966  8/1984  European Pat. Off. ...... G06K 7/14

OTHER PUBLICATIONS

IBM Bulletin-Implementation of Focus-Defocus Thresholding Including Dark Current Cancellation in CCD Optical Scanner System-White vol. 20 No. 12-May 1978.

*Primary Examiner*—Harold Pitts
*Attorney, Agent, or Firm*—Parmelee, Bollinger & Bramblett

[57] ABSTRACT

Dual-focus optical scanner for scanning an object, provided with optical illuminating means for illumating the object to be scanned with a light point derived from a light source, which illuminating means have their own optics, and with optical imaging means for imaging the object onto a point sensor, which imaging means have their own optics. Said illuminating means and said imaging means are embodied in a coaxial relation with substantially coincident optical axes. The focal plane of the illuminating optics and the focal plane of the imaging optics in the object area are slightly spaced, the separation of said two spaced focal planes being such that the working range of the scanner is the sum of the depths of field of the illuminating and imaging optics, defined according to required spatial resolution. Said optical scanner can be used as a wandtype symbol code reader, such as a bar code reader, for reading the symbol code by relative manual scan movement. The reader includes at least one lens or lens-set (5), and in the optical path of the illuminating means a deflection member (4) is positioned between the one lens or lens-set (5) and the light source (1) for de-flecting the light, scattered from the symbol code, onto the sensor (9).

5 Claims, 1 Drawing Sheet

DUAL-FOCUS OPTICAL SCANNER AND SUCH A SCANNER USED AS WANDTYPE SYMBOL

FIELD OF THE INVENTION

The invention relates to an optical scanner for scanning an object, provided with optical illuminating means for illuminating the object to be scanned with a light point derived from a light source, which illuminating means have their own optics, and with optical imaging means for imaging the object onto a point sensor, which imaging means have their own optics. The invention also relates to such an optical scanner, embodied as a wandtype symbol code reader. Such scanners are known in practice.

BACKGROUND OF THE INVENTION

In such a scanner scanning may be obtained by moving the scanner instead of using an automatic scanning geometry. Under application of simple optical elements, such as an optical fiber or light collector, the light, in general from an incoherent light source illuminates the object and light scattering therefrom is collected through, for instance, an optical fiber by a sensor. Generally, scanners of this type can operate without imaging optics and during the scanning the scanner is contacting the object, e.g. a symbol code surface.

Now in order to obtain non-contact reading some scanners use simple optical imaging means. However, due to the relative compact size and its use often of a low-cost incoherent light source, the associated depth of field is very limited. Moreover, in practical use, the scanner is moved opposite the object surface on a distance of several millimeters to several centimeters due to the fact for example that the object, e.g. a symbol code, is behind a glass or foil cover. The range then in which the object has to be investigated or read should be as large as possible. This means that the depth of field for the illuminating optics or the imaging optics should be as large as possible. Even in the case that a coherent light source is used, like a laser for which the depth of field of the optics can be less limited, there is always the requirement of having a working or reading range as large as possible.

In general, scanners can be classified in two types of operation. In the one type, the so called active mode type, a thin beam pencil is used to scan the object. The light scattering therefrom is detected in order to derive information therefrom. In order to form this beam pencil a focussing optics has to be used. In the other mode type the so called passive mode is used. In this type, the object is imaged onto a sensor by means of an imaging optics and the information of the object surface is detected by this sensor in ambient light with or without additional illumination.

Upon scanning the object like a symbol code with a light beam the size of the scanning point on the bar code should be small enough to distinguish the narrow symbol or bar. In a passive scanner, the resolution of the imaging optics has to be sufficient to distinguish the smallest object information or bar width, the size of the spot on the photo sensor should be smaller than or equal to the bar width. The higher is the resolution of the illuminating optics or imaging optics, the thinner is the bar code that can be read. The requirements for high spatial resolution and large depth of field cannot, however, be met simultaneously. The high spatial resolution of an optical system leads to small depth of field. Said depth of field is proportional to the relative optical lens aperture and inversely proportional to the size of the image spot. Thereby the depth of field is limited by the required spatial resolution.

SUMMARY OF THE INVENTION

The invention aims to obviate above problems and to extend the working distance or depth of field of an optical scanner in order to improve the practical use of such a scanner and to enable the user to handle the scanner freely in a non-contacting manner over the object.

In a scanner as indicated in the introduction this is solved according to the invention such that said illuminating means and said imaging means are embodied in a coaxial relation with substantially coincident optical axes, and that the focal plane of the illuminating optics and the focal plane of the imaging optics in the object area are slightly spaced. In such a scanner both optics of the scanner are embodied so that the separation of the two spaced focal planes is such that the working range of the scanner is the sum of the depths of field of the illuminating and imaging optics, defined according to required spatial resolution. When this scanner is to be used as a wandtype symbol code reader, such as a bar code reader, for reading the symbol code by relative manual scan movement, in the optical path of the illuminating means a deflection member is positioned between the one lens or lens-set and the light source for deflecting the light, scattered from the symbol code, onto the sensor.

In this advantageous embodiment according to the invention the two mentioned modes are combined thereby extending the total depth of field of the scanner. Within the total depth of field for this new system, if the object or symbol code is out of focus of the imaging optics, the illumination beam can be used as the scanning beam. In this "active" mode, the total scanner or the object, i.e. symbol code surface, can be moved, and thereby the illumination beam will scan the symbol code. The light scattering from the symbol code will be collected by the imaging optics onto the sensor. In the other mode, when the symbol code is out of focus of the illumination optics, it can be in focus for the imaging optics. The symbol code will still be illuminated by the illumination beam and is imaged by the imaging optics. The image focussed by the imaging optics will appear on the sensor acting as the image detector. When the sensor is small enough, during the movement of the scanner or object, i.e. the symbol surface, the "image" of the small sensor will scan the symbol code and then detect it. In this case, the scanner seems to work in an image scan mode or passive mode. The total depth of field then may be the sum of both depth of field of illuminating and of imaging optics because the implementation is such that the focal planes of the illuminating optics and the imaging optics in the bar code area are slightly spaced apart. In such an embodiment, in which the two optics extend substantially coaxial, aberration is expected to be small.

BRIEF DESCRIPTION OF THE DRAWINGS

The invention will be explained on the basis of an exemplary embodiment with reference to the drawings, in which.

DESCRIPTION OF THE PREFERRED EMBODIMENTS

Although the explanation in the following is given with emphasis on the dual-focus scanner of the wand-type having an incoherent light source, it is clear that the invention covers any dual-focus scanner for investigating or scanning an object, having either a coherent light source or an incoherent light source.

Figure 1:
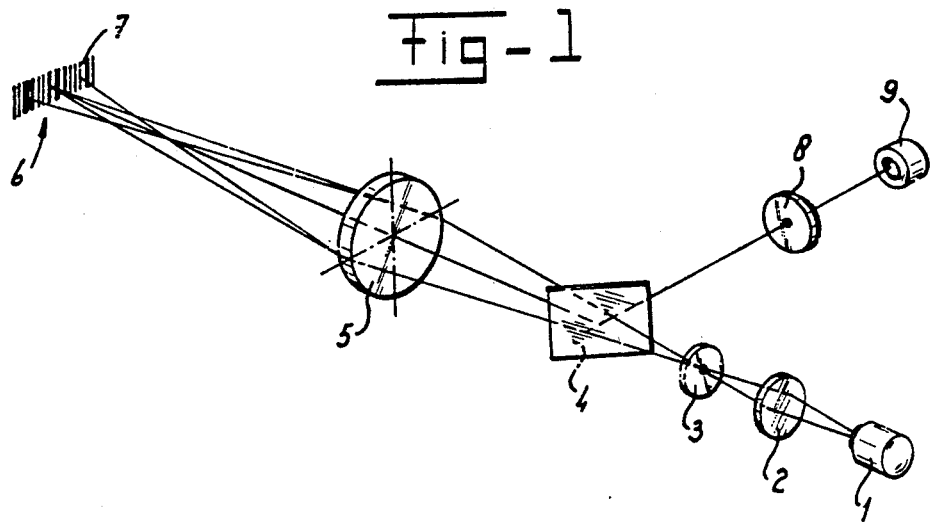
FIG. 1 is a principal representation of a simple embodiment of the dual focussing system according to the invention.

FIG. 1 shows the diagram of a simple dual-focus wandtype reader according to the invention. The light is emitted by a point light source consisting of, for instance, a light emitting diode (LED) 1, a lens or lens-set 2 and a spacial filter (pinhole) 3. The light from the light emitting diode (LED) 1, is focussed by lens 2 onto said pinhole 3. The illuminated pinhole can be regarded as a point source. The light from the pinhole 3 is directed to a beam splitter 4, e.g. halfmirror 4. The light beam is then directed to a lens or lens-set 5 by means of which the beam is focussed along its optical axis onto point A in the focal plane in the bar code reading space 6. The light scattering from the bar code 7 in this space is collected by the lens or lens-set 5 after which it is deflected by the beam splitter 4 onto a point-shaped light sensor, which may consist of another pinhole 8 and a sensor 9, e.g. a photo diode or photo transistor. Through this pinhole 8 the light is collected and detected by the sensor 9. The position of the corresponding image of the spatial filter 8 is at point B in the focal plane in the bar code reading space 6. The distance between the points A and B depends on the depth of field for both illuminating and imaging optics as follows.

Figure 2A:
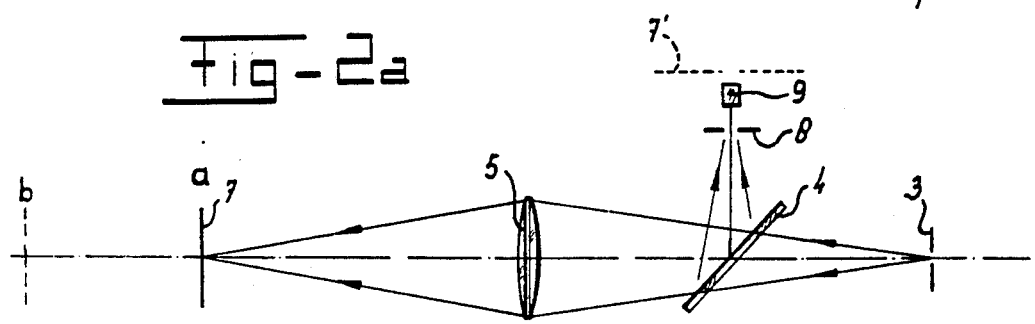
FIGS. 2a, 2b and 3 show details of the embodiment of FIG. 1.
Figure 2B:
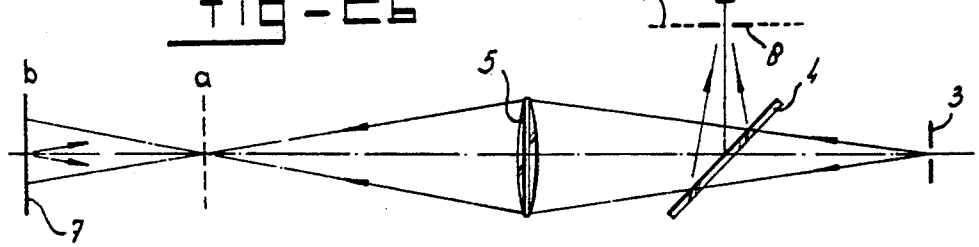
Figure 3:
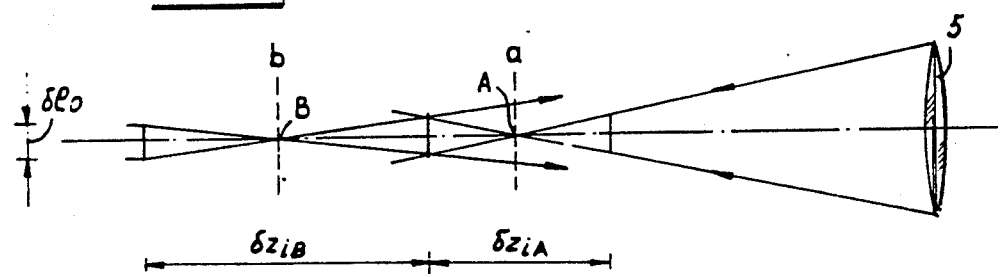

In the following FIGS. 2a, 2b and 3 are explained. The light from pinhole 3 is focussed to the point A by the lens or lens-set 5. The plane through this point and normal to the optical axis is called the focal plane a. The illuminated object at point B, can be sharply imaged by the same lens 5 through the beam splitter 4 on the pinhole 8. The plane through the point B and normal to the optical axis is called the focal plane b.

FIG. 2(a) shows the case that the bar code, 7, is located in the focal plane a. The image, 7', of the bar code will appear on a plane, differing from pinhole 8. When the bar code is moving in plane a, the light point will scan it, and the light scattering from bar code 7 will be detected through pinhole 8 by the detector 9. In this case, optical sensor 9 detects the light modulated by bar code 7. The scanner in this case works in the active mode.

The spatial resolution of this scanner depends on the size of the scanning point. As shown in FIG. 3, when the bar code is shifted from the plane a, the size of the scanning point will be increased. As long as the scanning point size is restricted within the required limitation (spacial resolution in the active mode), $\delta\rho_{oA}$, the bar code is still detectable. The corresponding shift range, $\delta Z_{iA}$, is the depth of the field for this scanner in the active mode.

FIG. 2(b) shows the case that the bar code, 7, is located in the focal plane b. The light from the pinhole 3 is focused to A by the lens or lens-set 5 and then, illuminates the bar code 7. The light point on the bar code can be large such that by active mode the scanner can not read the bar code. However, the sharp image, 7', of the bar code will appear on the plane containing pinhole 8. When the bar code is moving in this plane, this image 7' will sweep the pinhole 8 and through it, it is detected by the detector 9. Here, the detection set (pinhole 8 and optical sensor 9) detects the bar code image, 7'. The scanner in this case works in the passive mode.

The spacial resolution of this scanner depends on the size of pinhole 8. When the bar code is shifted from the plane b, the image 7' will be blurred. As long as the scanning point size on bar code, corresponding to the blurred point on plane 8, is restricted within the required limitation (spacial resolution in the passive mode), $\delta\rho_{oB}$, the bar code is still detectable. The corresponding shift range, $\delta Z_{iB}$, is the depth of the field in passive mode.

As shown in FIG. 3, the separation of the two focal planes a and b for this scanner is arranged such that the total working range for this scanner equals the sum of the depths of active and passive modes.

In this dual-focus scanning system the illuminating source is assumed to be a point source (through the pinhole). As indicated above, the light is focussed into a spot at point A, in the space where the bar code is situated, by means of lens 5 having an aperture $\phi_A$. When point A is at a distance $z_{iA}$ from the exit plane or pupil of this lens, having a maximum allowable point diameter $\delta\rho_{oA}$ ($=\delta\rho_o$), the depth of field is estimated by:

$$\delta z_{iA} = 2(z_{iA}/\phi_A)\delta\rho_o.$$

Within the range $z_{iA} \pm \delta z_{iA}$ the bar code can be scanned by this light source and one can obtain correct information therefrom. Outside of this range, as explained above, the scanning point is too large for correct reading. The light scattering from the bar code is collected by the imaging optics. Through this optics, the bar code is imaged onto the sensor which is assumed to be a point sensor through the pinhole 8. As indicated above, the corresponding image position of the point-shaped sensor is assumed in the bar code reading space at point B at a distance $z_{iB}$ from the exit pupil of the imaging optics. The corresponding depth of field in this imaging optics, with maximum allowable image point diameter $\delta\rho_{oB}$ ($=\delta\rho_{oA}$), is approximated by $$\delta z_{iB} = 2(z_{iB}/\phi_B)\delta\rho_o.$$

This means that when the bar code is within the range of $z_{iB} \pm \delta z_{iB}$, said bar code can be imaged onto a point shaped sensor and can be detected by it correctly.

By chosing or arranging the distance between points A and B to be ($\delta z_{iA} + \delta z_{iB}$) the depth of field is then extended to be the sum of the depth of fields of both optics. Within this extended depth of field, when the bar code is out of focus of the illuminating optics, it still can be read by the imaging optics. In this case, the illuminating optics provides a beam to illuminate the bar code. In the other case, when the bar code is out of focus of the imaging optics, it will be scanned by the light from the illuminating optics. The imaging optics then just acts as a collector for scattered light.

With respect to the requirements for reading resolution of the bar code reader, the following is observed. The fact that the binary signal of bar code of certain spatial frequency can also be contained from the sinusoidal signal of the same frequency, leads to the conclusion that the spatial resolution of the optical system for bar code reading is required to be sufficient to detect only the basic spatial frequency corresponding to the narrowest bar code.

Furthermore it is clear that for obtaining a high spatial resolution in an active scanner, the size of the illuminating source or the corresponding pinhole, should be as small as possible. Also for a passive scanner, the detector or its corresponding pinhole should be as small as possible. A further analysis leads to the conclusion that for a circular scanning point or spot, the bar code is still readable even in the case that the diameter of the scanning part equals the period of the bar code.

I claim:

1. An optical scanner for scanning an object, provided with optical illuminating means for illuminating the object to be scanned with a light point derived from a light source, which illuminating means have their own optics, and with optical imaging means for imaging the object onto a point sensor, which imaging means have their own optics, characterized in that said illuminating means and said imaging means are embodied in a coaxial relation with substantially coincident optical axes, and that the focal plane (A) of the illuminating optics and the focal plane (B) of the imaging optics in the object area are slightly spaced.

2. An optical scanner according to claim 1, wherein both optics of of the scanner are embodied so that the separation of the two spaced focal planes (A and B) is such that the working range of the scanner is the sum of the depths of field of the illuminating and imaging optics, defined according to required spatial resolution.

3. An optical scanner according to claims 1 or 2, to be used as a wandtype symbol code reader, such as a bar code reader, for reading the symbol code by relative manual scan movement, including at least one lens or lens-set (5), wherein in the optical path of the illuminating means a deflection member (4) is positioned between the one lens or lens-set (5) and the light source (1) for de-flecting the light, scattered from the symbol code, onto the sensor (9).

4. A wandtype symbol code reader according to claim 3, wherein in the optical path of the illuminating means another lens or lens-set (2) is positioned near the light source (1) and that between the one lens or lens-set (5) and the other lens or lens-set (2) a pinhole (3) is positioned.

5. A wandtype symbol code reader according to claim 3, wherein in the optical path of the imaging means a pinhole (8) is positioned between the deflection member (4) and the sensor (9).

* * * * *